United States Patent
Bergquist et al.

(10) Patent No.: US 11,328,608 B2
(45) Date of Patent: May 10, 2022

(54) METHOD FOR CONTROLLING THE BRAKING OF A FOLLOWING VEHICLE OF A STRING COMPRISING A PLURALITY OF PLATOONING VEHICLES

(71) Applicant: VOLVO TRUCK CORPORATION, Gothenburg (SE)

(72) Inventors: Stefan Bergquist, Gothenburg (SE); Wilhelm Wiberg, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 219 days.

(21) Appl. No.: 16/491,246

(22) PCT Filed: Mar. 27, 2018

(86) PCT No.: PCT/EP2018/025072
§ 371 (c)(1),
(2) Date: Sep. 5, 2019

(87) PCT Pub. No.: WO2018/177605
PCT Pub. Date: Oct. 4, 2018

(65) Prior Publication Data
US 2020/0035104 A1    Jan. 30, 2020

Related U.S. Application Data

(63) Continuation-in-part of application No. PCT/EP2017/057276, filed on Mar. 28, 2017.

(51) Int. Cl.
*G08G 1/00* (2006.01)
*B60W 30/16* (2020.01)
(Continued)

(52) U.S. Cl.
CPC .............. *G08G 1/22* (2013.01); *B60W 10/18* (2013.01); *B60W 30/16* (2013.01);
(Continued)

(58) Field of Classification Search
CPC .......... G08G 1/16; G08G 1/161; G08G 1/162; G08G 1/163; G08G 1/22; H04W 4/46;
(Continued)

(56) References Cited

U.S. PATENT DOCUMENTS

| 2011/0196580 A1* | 8/2011 | Xu | G01S 11/14 |
| | | | 701/48 |
| 2013/0041576 A1* | 2/2013 | Switkes | G08G 1/22 |
| | | | 701/123 |

(Continued)

FOREIGN PATENT DOCUMENTS

| CN | 102729994 A | 10/2012 |
| CN | 105160865 A | 12/2015 |

(Continued)

OTHER PUBLICATIONS

EPO machine translation Wefelmeier EP-1174319-A2 (Apr. 1, 2021) (Year: 2021).*

(Continued)

*Primary Examiner* — Kevin P Mahne
(74) *Attorney, Agent, or Firm* — Venable LLP; Jeffri A Kaminski (57) ABSTRACT

The invention relates to a method for a string comprising a plurality of vehicles platooning by means of vehicle-to-vehicle (V2V) communication, comprising collecting (S1) from a plurality of sources (111, 1021, 1022, 1023) values (OP1-OP3) of operational parameters related to the operation of a first (1) of the vehicles, characterized by determining (S2) based on the operational parameter values (OP1-OP3) a plurality of values (AP1-AP3) of an acceleration parameter indicative of an acceleration of the first vehicle, and selecting (S3) from the acceleration parameter values (AP1-AP3) an extreme value (AP2) indicative of the lowest acceleration of the first vehicle (1).

25 Claims, 4 Drawing Sheets

(51) Int. Cl.
*G05D 1/02* (2020.01)
*B60W 10/18* (2012.01)
*H04W 4/46* (2018.01)

(52) U.S. Cl.
CPC ............ *G05D 1/0295* (2013.01); *H04W 4/46* (2018.02); *B60W 2554/801* (2020.02); *B60W 2554/804* (2020.02); *B60W 2556/65* (2020.02); *G05D 2201/0213* (2013.01)

(58) Field of Classification Search
CPC .... B60W 10/04; B60W 10/18; B60W 10/184; B60W 10/188; B60W 10/192; B60W 30/14; B60W 30/143; B60W 30/16; B60W 30/162; B60W 30/165; B60W 30/17; B60W 2554/00; B60W 2554/80; B60W 2554/801; B60W 2554/802; B60W 2554/803; B60W 2554/804; B60W 2556/65; B60W 2050/008; B60W 2050/0077; B60W 2050/0079; B60W 2050/048; G05D 1/0287; G05D 1/0289; G05D 1/0291; G05D 1/0293; G05D 1/0295; G05D 2201/0213
See application file for complete search history.

(56) References Cited

U.S. PATENT DOCUMENTS

2017/0227972 A1* 8/2017 Sabau .................. G08G 1/22
2017/0344023 A1* 11/2017 Laubinger ............ B60W 50/14
2018/0210461 A1* 7/2018 Cremona .............. G08G 1/22
2018/0210463 A1* 7/2018 Switkes ............... G05D 1/0088
2019/0025857 A1* 1/2019 Luckevich ........... G05D 1/0295
2019/0206260 A1* 7/2019 Pilkington ............ B60Q 1/44
2019/0346861 A1* 11/2019 Switkes ................ H04L 67/12
2020/0388164 A1* 12/2020 Domprobst .......... G08G 1/22

FOREIGN PATENT DOCUMENTS

| CN | 105492287 A | 4/2016 | |
|---|---|---|---|
| CN | 105774800 A | 7/2016 | |
| EP | 1174319 A2 * | 1/2002 | ....... G08G 1/096791 |
| WO | 2010117308 A1 | 10/2010 | |
| WO | 2013006826 A2 | 1/2013 | |
| WO | 2014145918 A1 | 9/2014 | |
| WO | 2016065055 A1 | 4/2016 | |
| WO | 2016134770 A1 | 9/2016 | |

OTHER PUBLICATIONS

International Search Report dated Jun. 29, 2018 in International Application No. PCT/EP2018/025072.
Written Opinion dated Jun. 29, 2018 in International Application No. PCT/EP2018/025072.
International Preliminary Report on Patentability dated Jun. 24, 2019 in International Application No. PCT/EP2018/025072.
China Office Action dated Jun. 23, 2021 in corresponding China Patent Application No. 201880021152.6, 26 pages.

* cited by examiner

METHOD FOR CONTROLLING THE BRAKING OF A FOLLOWING VEHICLE OF A STRING COMPRISING A PLURALITY OF PLATOONING VEHICLES

TECHNICAL FIELD

The invention relates to a method for a string comprising a plurality of vehicles platooning by means of vehicle-to-vehicle (V2V) communication. The invention also relates to a computer program, a computer readable medium, a control unit and a vehicle.

The invention can be applied in heavy-duty vehicles, such as trucks and buses. Although the invention will be described with respect to trucks, the invention is not restricted to this particular vehicle, but may also be used in other vehicles such as cars.

BACKGROUND

In platooning, e.g. by means of Cooperative Adaptive Cruise Control (CACC), vehicle convoys are driven with short distances between the vehicles. Thereby the vehicles form what is herein referred to a string. To achieve this with a high safety, a control unit of each vehicle receives information from surrounding vehicles over a wireless communication channel, so called Vehicle-to-Vehicle (V2V) communication. For example, as suggested in WO2013006826, such shared information may include brake pressure, engine torque, engine RPM, accelerator pedal position, engine manifold pressure, vehicle speed, and radar/lidar data.

This information is used in the control to keep the desired distance between each vehicle and the immediately preceding vehicle and to handle events such as hard braking. The V2V communication enables keeping short distances safely since the V2V information is transferred much faster and is more accurate than data from on-board sensors such as radar sensors, laser sensors or cameras.

It is understood that the V2V communication may involve controlling the velocity and/or acceleration of a vehicle the string in dependence on the signals received from another vehicle in the string. The string may be formed of a row of vehicles, one following another.

Benefits with platooning, e.g. by CACC, include increased fuel efficiency, provided by a reduced air-drag due to short distances between vehicles, and provided by improved vehicle control due to more accurate information about the preceding vehicle.

A further benefit is an improved traffic flow due to the small delay of the V2V data. For example, the traffic flow may be improved by reducing or eliminating the so called rubber-band effect between vehicles. Such an effect may appear due to the delay of a detection by a vehicle of a deceleration of a preceding vehicle, causing a stronger deceleration of the detecting vehicle, upon which a delay of a detection by a following vehicle of the stronger deceleration causing an even stronger deceleration of the following vehicle, and so on. In CACC based control the rubber band effect will be considerably reduced due to the decreased delay, and due to a detecting vehicle being able to take into account signals from vehicles in front of the immediately preceding vehicle.

Yet another benefit with CACC and platooning is an improved driver comfort since CACC allows less aggressive vehicle control compared to systems using on-board sensors exclusively.

WO2014145918A1 discloses collecting data related to platooning vehicles, by a distance/relative speed sensor, and a communication link, where information about a braking event, accelerometer data, brake pressure, tire pressure, and information about obstacles or other vehicles in front of a lead truck, is sent from a front vehicle to a rear vehicle.

WO2016065055A1 discloses receiving, via a wireless communications link, a time stamped control signal of a predecessor vehicle, and determining a time stamped distance (e.g. using lidar or radar) between a vehicle and the predecessor vehicle para. The determined distance and received control signal are then synchronized based on the time stamps. A control action to maintain a desired distance between the vehicle and the predecessor vehicle can be generated based on the synchronized determined distance and received control signal.

WO2010117308A1 discloses calculating a driver's expected future behaviour, and comparing the expected future driver behaviour with a standard driver behavior. In an example, a first algorithm calculates the expected deceleration impressed by a braking action of the driver. In a comparison algorithm, a decision that a manoeuvre is hazardous depends on whether the calculated expected deceleration is above a threshold based on field data.

WO2016134770A1 discloses determining a deceleration capacity for a lead vehicle based on a friction estimation, and it is suggested that thereby the lead vehicle remains predictable for the following vehicles, even if a slippery road reduces the deceleration capacity and calls for earlier braking.

Notwithstanding said benefits, there is still room for improvement of known CACC and other platooning strategies. There is a desire to improve the provision of early indicators of control actions of vehicles in a platoon, in order to increase the safety in connection with vehicle platooning.

SUMMARY

An object of the invention is to increase the safety in connection with vehicle platooning.

The object is reached by a method according to claim 1. Thus, the invention provides a method for a string comprising a plurality of vehicles platooning by means of vehicle-to-vehicle (V2V) communication, comprising collecting from a plurality of sources values of operational parameters related to the operation of a first of the vehicles, characterized by determining based on the operational parameter values a plurality of values of an acceleration parameter indicative of an acceleration of the first vehicle, and selecting from the acceleration parameter values an extreme value indicative of the lowest acceleration of the first vehicle.

At least one of the acceleration parameter values may be indicative of a predicted acceleration of the first vehicle. Thus, at least one of the acceleration parameter values may be based on an operational parameter which is indicative of an expected acceleration of the first vehicle. For example, there is normally a time lag from a manipulation of a brake pedal of the first vehicle, or from an increase of a pressure in a brake circuit of the first vehicle, to a negative acceleration of the first vehicle. Thereby, the brake pedal position and the brake circuit pressure may be operational parameters which are indicative of an expected acceleration of the first vehicle. However, at least one of the acceleration parameter values may be indicative of an actual acceleration of the first vehicle. For example, at least one of the acceleration parameter values may be a measured acceleration of the first vehicle.

It should be noted that in embodiments of the invention, the operational parameters, the acceleration parameter, and/or the extreme value, may be adjusted in view of one or more circumstances, such as the wheel to road friction, the road inclination, a gear change, a speed limit, a safety system alert, and/or a driver braking or acceleration action overriding the platooning system.

The determined acceleration parameter values are preferably of the same unit, e.g. $m/s^2$. Thereby, the determined acceleration parameter values are readily comparable to each other for the selection of the extreme value from the acceleration parameter values. Thus, advantageously the operational parameter values, which may be of different units, are transformed, by the determination of the acceleration parameter values, into easily comparable values for the extreme value selection.

By determining based on the operational parameter values the plurality of acceleration parameter values, and selecting from the acceleration parameter values an extreme value indicative of the lowest acceleration of the first vehicle, the invention provides a way to make a very early prediction of the acceleration of the first vehicle. The provision of the extreme value indicative of the lowest acceleration, or the highest deceleration, of the first vehicle may be used to provide an early alert to other vehicles in the string about a potential control action of the first vehicle which will require control actions of the other vehicles. By the earliness of the alert, response actions may be taken with increased safety margins.

More specifically, there may be different latencies between the acceleration indications of different operational parameters, e.g. a brake pedal position and a brake circuit pressure, to the actual resulting vehicle acceleration. By embodiments of the invention "translating" the collected operational parameter values to comparable acceleration parameter values, and selecting the acceleration parameter value indicative of the lowest acceleration of the first vehicle, the earliest possible prediction of the acceleration may be obtained. This enables quick reactions of follower vehicles on braking manoeuvres of the first vehicle. It may even be possible to provide for the actual retardation to be substantially simultaneous in the first vehicle and all vehicles following the first vehicle in the string. Thereby it is possible to avoid collisions in a vehicle string when a vehicle therein brakes hard. Thus, the prediction of control actions of vehicles in a platoon is improved, whereby the safety in connection with vehicle platooning is increased.

Preferably, determining the acceleration parameter values is done by the first vehicle, for example, by a control unit of the first vehicle. Preferably, also selecting the extreme value is done by the first vehicle. The extreme value may be sent by means of the V2V communication to a second of the vehicles following behind the first vehicle. Thereby, only the extreme value, as opposed to the plurality of operational parameter values or the plurality of acceleration parameter values, may be sent by the V2V communication to the second vehicle. Thereby, the band width usage of the V2V communication may be reduced.

However, in some embodiments, the operational parameter values may be sent by means of the V2V communication to the second vehicle, wherein determining the acceleration parameter values is done by the second vehicle. In further embodiments, the acceleration parameter values may be sent by means of the V2V communication to the second vehicle. Thereby, selecting the extreme value may be done by the second vehicle. Thereby, the second vehicle may advantageously obtain control of the determination of the extreme value.

The second vehicle, which determines, or receives by means of the V2V communication, the extreme value, may initiate in dependence on the extreme value a control of braking means for a braking action of the second vehicle. Thereby, the second vehicle may take advantage of the early indication provided by the selection of the extreme value from the acceleration parameter values based on the operational parameter values, by automatically initiating the brake action at an early stage.

Preferably, initiating the braking means control comprises controlling the braking means for providing a braking force of the second vehicle which is proportional to the extreme value, or controlling the braking means for providing a braking force of the second vehicle which is at a maximum level.

Thus, according to one alternative, initiating the braking means control comprises controlling the braking means for providing a braking force of the second vehicle which is proportional to the communicated value. It is understood that the communicated value can be positive or negative. Similarly to what is suggested below, the braking force being proportional to the extreme value may be understood as the braking force being proportional to the absolute value of the extreme value. Thereby, where the extreme value is representative of a relatively low deceleration of the first vehicle, the braking means may be controlled for providing a relatively low braking force of the second vehicle. Where the extreme value is representative of a relatively high deceleration of the first vehicle, the braking means may be controlled for providing a relatively high braking force of the second vehicle. Thus, the braking force of the second vehicle may be adapted to the level of first vehicle acceleration indicated by the extreme value.

Alternatively, initiating the braking means control comprises controlling the braking means for providing a braking force of the second vehicle which is at a maximum level. In such an alternative, initiating the braking means control may comprise controlling the braking means for providing a braking force of the second vehicle which is at a maximum level if the absolute value of the communicated value is above a predetermined threshold value absolute value. Similarly to what is suggested below, the communicated value may be compared to the predetermined threshold value. Similarly to what is suggested below, the maximum level of the braking force may be understood as a level at which the vehicle braking system is used to its full potential.

Similarly to what is described below, in some embodiments, controlling the braking means for providing a braking force of the second vehicle which is proportional to the communicated value, may involve a brake control device controlling the braking means so as to provide a braking force of the second vehicle which is proportional to the communicated value. In some embodiments, controlling the braking means for providing a braking force of the second vehicle which is proportional to the communicated value, may involve a CACC control device sending request to a brake control device to provide a braking force, a braking moment, or a deceleration of the second vehicle which is proportional to the communicated value. In such embodiments, e.g. where the brake system comprises an anti-lock braking system, the request from the CACC control device may be a request for a braking moment, a braking force, or a deceleration, which is the same as, or dissimilar to, the braking moment applied to the wheels, or the braking force or deceleration that the vehicle is subjected to.

Both said alternatives may provide a high braking force to avoid a collision. As suggested elsewhere herein, adjusting the braking means control may comprise controlling the braking means to abort the braking action. Thus, an indication, received with the V2V communication, of a high deceleration of the vehicle in front, may be followed by a high braking force, which is later abandoned if the high deceleration V2V indication proves to be incorrect. As suggested below, it has been realized that hard braking may not cause safety concerns, if effected only during the short time from its initiation to its abandonment due to lack of confirmation. Thus, a quick and fully effective response is combined with avoidance of unnecessary safety hazard. This, in combination with the early indication provided by the selection of the extreme value from the acceleration parameter values based on the operational parameter values, provides a highly responsive and flexible strategy for the platooning.

Preferably, where the second vehicle is provided with a movement sensor for determining the distance to, velocity of and/or acceleration of a vehicle in front of the second vehicle, the second vehicle determines, subsequently to the braking means control initiation, at least partly based on signals from the movement sensor whether to adjust the braking means control. It is understood that the movement sensor may be used for determining the absolute or relative velocity of and/or acceleration of the vehicle in front of the second vehicle.

Thus, for example, as soon as the first vehicle brakes hard, or is predicted to brake hard, e.g. within a few milliseconds, the extreme value, indicating an actual or predicted acceleration of the first vehicle, is sent to the second vehicle, and the second vehicle immediately initiates activation of its brakes based on the received extreme value. The braking means control initiation may involve sending a brake request from a control unit of the second vehicle to a brake control device arranged to actuate at least one brake control valve for a respective of at least one brake circuit of the second vehicle. Normally there is due to system lags a time lag from the braking means control initiation to the resulting acceleration of the second vehicle, e.g. from the brake request to a pressing of brake pads against brake discs of wheels of the second vehicle, and from such brake applications to the building up of a large deceleration of the second vehicle. During this time lag, the second vehicle may compare the acceleration of the first vehicle indicated by the extreme value, determined, or received over the V2V communication, by the second vehicle, to information based on the signals from the movement sensor. If the information based on the signals from the movement sensor substantially agree with the extreme value, the brake maneuver can continue and valuable time has been saved since the decision to brake was taken immediately.

However, adjusting the braking means control may comprise controlling the braking means to abort the braking action. The validation of the extreme value provided by embodiments of the invention solves the problem that data sent in the V2V communication may be corrupted. Such corruption may lead to unwanted automatic control measures of one or more vehicles in a string, which in turn may be uncomfortable or even dangerous to persons travelling in the vehicles.

As a result of embodiments of the invention, if the information based on the signals from the movement sensor disagrees with the extreme value, the brake maneuver of the second vehicle can be discontinued immediately, without the braking means control having resulted in a fully developed acceleration of the second vehicle. Thereby an unnecessary hard brake action may be avoided, supporting a safe operation of the string of platooning vehicles. Therefore, embodiments of the invention provides for a high readiness for hard braking actions, but makes sure the brake event is based on correct data. Thus, a short distance between vehicles in the string is allowed while providing validations of input data used to take decisions to brake hard.

In some embodiments, determining whether to adjust the braking means control comprises determining based on the signals from the movement sensor a further value of the acceleration parameter indicative of the acceleration of a vehicle in front of the second vehicle, and comparing the further acceleration parameter value with the extreme value. Thereby, the braking means control is preferably adjusted if the further acceleration parameter value is above the extreme value by more than a tolerance amount. This provides a simple manner of checking whether the information based on the signals from the movement sensor agrees within a tolerance limit with the extreme value. Thus, the tolerance value allows for taking into account differences between the compared values, e.g. due to time lags in a braking system of the first vehicle.

The method may comprise determining the tolerance amount at least partly based on the extreme value. Thereby, the decision whether to adjust the braking means control may advantageously depend on the size of the extreme value, e.g. the size of the predicted acceleration of the first vehicle. For example, where the extreme value is representative of a relatively high acceleration, or low deceleration, of the first vehicle, the tolerance amount may be determined to be relatively low, and where the extreme value is representative of a relatively low acceleration, or high deceleration, of the first vehicle, the tolerance amount may be determined to be relatively high.

In some alternative embodiments, the tolerance amount is predetermined. Thereby, a simple strategy may be provided, e.g. by setting the tolerance amount to be conservative covering all braking levels, and all time lapses between the acceleration related data collection, and the brake means control adjustment decision.

Preferably, the determination whether to adjust the braking means control is partly based on a lapse of time from the collection of the operational parameter value based on which the extreme value is determined, to the comparison of the further acceleration parameter value with the extreme value. For example, the method may comprise determining the tolerance amount at least partly based on the lapse of time from the collection of the operational parameter value based on which the extreme value is determined, to the comparison of the further acceleration parameter value with the extreme value. For this, there may be a time synchronization between the vehicles in the string. Where the first vehicle sends the extreme value, information about the time of collection of the operational parameter value, based on which the extreme value was determined, may be sent along with the extreme value. Said lapse of time may then be determined by the second vehicle. In some embodiments, the data sent to the second vehicle may include information about the time of the determination of the extreme value based on the operational parameter value, wherein also the lapse of time between the collection of the operational parameter value and the determination of the extreme value may be taken into account for determining the tolerance amount. Since there is normally a delay in time from the collection of the operational parameter value, to a resulting acceleration of the first vehicle which is registered by the movement sensor of the second vehicle, the tolerance amount may be relatively large for a relatively short lapse of time from the collection of the operational parameter value to the comparison of the further acceleration parameter value with the extreme value. For a relatively long lapse of time from the collection of the operational parameter value to the comparison of the further acceleration parameter value with the extreme value, the tolerance amount may be relatively small. Thereby, an advantageous adaption of the decision on whether to adjust the brake means control to the lapse of time from the collection of the operational parameter value, to the comparison of the further acceleration parameter value with the extreme value, will be obtained.

Embodiments of the invention are applicable where the second vehicle follows immediately behind the first vehicle. However, embodiments of the invention are also applicable where a third of the vehicles is travelling between the first and second vehicles. In such applications, the second vehicle may, upon receiving the extreme value from the first vehicle by means of the V2V communication, and initiating the braking means control, determine based on the signals from the movement sensor the acceleration of the third vehicle. Thereby, the second vehicle may determine whether to abort the braking action based on a comparison of the acceleration of the third vehicle, and the extreme value which is indicative of an acceleration or a predicted acceleration of the first vehicle.

The third vehicle may, similarly to the second vehicle in embodiment of the invention, be adapted to receive means of the V2V communication the extreme value, and to initiate in dependence on the extreme value a control of braking means for a braking action of the third vehicle. Further, the third vehicle may be provided with a movement sensor, whereby the third vehicle, subsequently to the braking means control initiation, may determine at least partly based on signals from the movement sensor whether to abort the braking action. Thereby, it may assumed that a disagreement between the extreme value and the further acceleration parameter value, obtained by means of the movement sensor of the second vehicle, is due to the third vehicle having decided to abort the braking action due to a disagreement between the extreme value and a further acceleration parameter value, obtained by means of the movement sensor of the third vehicle.

The object is also reached with a method for a string comprising a plurality of vehicles platooning by means of V2V communication, where a primary of the vehicles is provided with a movement sensor for determining the distance to, velocity of and/or acceleration of a vehicle in front of the primary vehicle, the primary vehicle determining, or receiving by means of the V2V communication, a communicated value of an acceleration parameter indicative of an acceleration of a secondary of the vehicles, in front of the primary vehicle, and initiating in dependence on the communicated value a control of braking means for a braking action of the primary vehicle, the primary vehicle, subsequently to the braking means control initiation, determining at least partly based on signals from the movement sensor whether to adjust the braking means control, wherein initiating the braking means control comprises controlling the braking means for providing a braking force of the primary vehicle which is proportional to the communicated value, or controlling the braking means for providing a braking force of the primary vehicle which is at a maximum level.

In references herein to some embodiments and aspects of the invention, the primary vehicle is referred to as a second vehicle, and the secondary vehicle is referred to as a first vehicle. Also, in references herein to some embodiments and aspects of the invention, the communicated value is referred to as an extreme value.

Thus, according to one alternative, initiating the braking means control comprises controlling the braking means for providing a braking force of the primary vehicle which is proportional to the communicated value. It is understood that the communicated value can be positive or negative. The braking force being proportional to the communicated value may be understood as the braking force being proportional to the absolute value of the communicated value. The absolute value is understood as the magnitude of a real number without regard to its sign. For example, communicated value can be negative where the communicated value is the acceleration of the secondary vehicle and the secondary vehicle is decelerating. The braking force being proportional to the communicated value means that a relatively low positive or negative value of the communicated value may provide a relatively low braking force, and a relatively high positive or negative value of the communicated value may provide a relatively high braking force. Similarly to what has been mentioned above, where the communicated value is representative of a relatively low deceleration of the secondary vehicle, the braking means may be controlled for providing a relatively low braking force of the primary vehicle. Where the communicated value is representative of a relatively high deceleration of the secondary vehicle, the braking means may be controlled for providing a relatively high braking force of the primary vehicle. Thus, the braking force of the primary vehicle may be adapted to the level of secondary vehicle acceleration indicated by the communicated value.

Alternatively, initiating the braking means control comprises controlling the braking means for providing a braking force of the primary vehicle which is at a maximum level. Preferably, in such an alternative, initiating the braking means control comprises controlling the braking means for providing a braking force of the primary vehicle which is at a maximum level if the absolute value of the communicated value is above a predetermined threshold value absolute value. As stated, the absolute value is understood as the magnitude of a real number without regard to its sign. In this alternative, the communicated value may be compared to the predetermined threshold value. The predetermined threshold value may be positive. If it is determined that the absolute value of the communicated value is above the predetermined threshold value, the maximum level braking force may be effected.

If it is determined that the absolute value of the communicated value is below the predetermined threshold value, one of various alternative courses of action may be carried out. For example, the braking means may be controlled for providing a braking force of the primary vehicle which is proportional to the communicated value, or no braking action may be provided until the communicated value has been confirmed by the movement sensor signals.

The braking means may be wheel brakes of the vehicle. The wheel brakes may be for example pneumatically or hydraulically actuated.

The primary vehicle may comprise a control unit, which may be provided as a single physical control device, or as a plurality of control devices. Each control unit, or each control device, may be provided as a programmable device adapted run a program so as to perform calculations and determinations for various control tasks of the vehicle. The control unit may for example comprise a CACC control device and a brake control device. The CACC control device may be arranged to send signals to other control devices. For example, the CACC control device may be arranged to send signals to the brake control device. Such signals may be CACC related signals for brake control by means of the brake control device. The brake control device may be arranged to control devices, such as one or more valves, in the vehicle brake system. The CACC control device may also be adapted to receive signals from the brake control device, e.g. regarding a brake pressure in the brake system.

In some embodiments, controlling the braking means for providing a braking force of the primary vehicle which is proportional to the communicated value, may involve a brake control device controlling the braking means so as to provide a braking force of the primary vehicle which is proportional to the communicated value. In some embodiments, controlling the braking means for providing a braking force of the primary vehicle which is proportional to the communicated value, may involve a CACC control device sending request to a brake control device to provide a braking force, a braking moment, or a deceleration of the primary vehicle which is proportional to the communicated value. In such embodiments, e.g. where the brake system comprises an anti-lock braking system, the request from the CACC control device may be a request for a braking moment, a braking force, or a deceleration, which is the same as, or dissimilar to, the braking moment applied to the wheels, or the braking force or deceleration that the vehicle is subjected to.

The maximum level of the braking force may be understood as a level at which the vehicle braking system is used to its full potential. Where the brake system is pneumatic or hydraulic, the maximum braking force level may be provided by a maximum pneumatic or hydraulic pressure in the brake system. The maximum braking force may involve the actuation of an anti-lock braking system, where applicable.

Determining at least partly based on signals from the movement sensor whether to adjust the braking means control, may comprise comparing the communicated value to a value derived from the movement sensor signals.

Both said alternatives may provide a high braking force to avoid a collision. As suggested elsewhere herein, adjusting the braking means control may comprise controlling the braking means to abort the braking action. Thus, an indication, received with the V2V communication, of a high deceleration of the vehicle in front, may be followed by a high braking force, which is later abandoned if the high deceleration V2V indication proves to be incorrect. Thereby, two things are accomplished. Firstly, the V2V is fully utilized to obtain a fast response to a potential emergency situation. Secondly, the conditioned brake means control adjustment provides a possibility to avoid unnecessary hard braking, and thereby to avoid a safety hazard, which such a hard braking may cause. It has been realized that hard braking may not cause safety concerns, if effected only during the short time from its initiation to its abandonment due to lack of confirmation. Thus, a quick and fully effective response is combined with avoidance of unnecessary safety hazard. Thereby, the safety in connection with vehicle platooning is increased.

Similarly to what has been described above, preferably, adjusting the braking means control comprises controlling the braking means to abort the braking action. Preferably, determining whether to adjust the braking means control comprises determining based on the signals from the movement sensor a further value of the acceleration parameter indicative of the acceleration of a vehicle in front of the primary vehicle, and comparing the further acceleration parameter value with the communicated value.

Preferably, the method comprises adjusting the braking means control if the further acceleration parameter value is above the communicated value by more than a tolerance amount. Preferably, the method comprises determining the tolerance amount at least partly based on the communicated value. However, the tolerance amount may alternatively be predetermined.

Preferably, the determination whether to adjust the braking means control is partly based on a lapse of time from a collection of an operational parameter value based on which the communicated value is determined, to the comparison of the further acceleration parameter value with the communicated value. For example, the method comprises determining the tolerance amount at least partly based on a lapse of time from a collection of an operational parameter value based on which the communicated value is determined, to the comparison of the further acceleration parameter value with the communicated value.

The primary vehicle may follow immediately behind the secondary vehicle, or a third of the vehicles may be travelling between the primary and secondary vehicles.

The object is also reached with a computer program according to claim 29, a computer readable medium according to claim 30, a control unit or a group of control units according to claim 31, or a vehicle according to claim 32. In some embodiments, the method may be performed by a single control unit in one of the vehicles in the string, and in other embodiments, the method may be performed by a group of control units distributed in at least two of the vehicles in the string.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
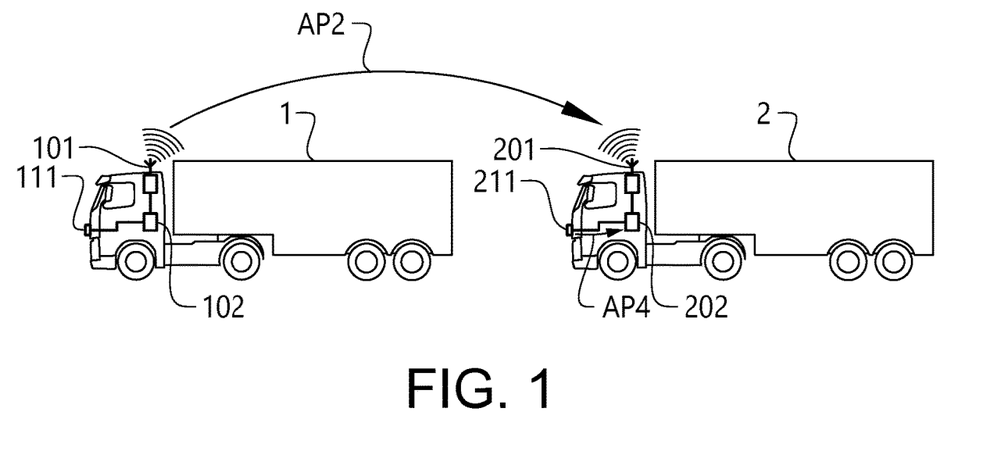
FIG. 1 is a side view of vehicles in a string of platooning vehicles.

FIG. 1 shows what is herein referred to as a first vehicle 1, and a second vehicle 2. In references herein to some embodiments and aspects of the invention, the second vehicle 2 is referred to as a primary vehicle 2, and the first vehicle 1 is referred to as a secondary vehicle 1. In this example, the vehicles 1, 2 are trucks with semitrailers. However, the invention is equally applicable to other types of vehicles, such as cars, buses and dump trucks.

Each of the vehicles 1, 2 comprises equipment 101, 201 for platooning, more specifically for Cooperative Adaptive Cruise Control (CACC), including means for wireless communication with a radio transmitter and a radio receiver for so called Vehicle-to-Vehicle (V2V) communication, and a data communication processing device which is arranged to communicate with a control unit 102, 202 of a respective vehicle control system. The wireless communication could be based on any other suitable industry standard format, such as WiFi, radio modem, or Zigbee. This wireless communication could alternatively be based on a non-industry-standard format.

By means of this equipment for CACC, each of the vehicles 1, 2 is adapted to transmit signals representative of the dimensions, velocity and acceleration of the respective vehicle to other vehicles comprising equipment for CACC. Further, each of the vehicles 1, 2 is adapted to receive signals representative of the dimensions, velocity and acceleration of other vehicles comprising equipment for CACC, and to control the velocity and acceleration of the respective vehicle based on the received signals.

The first and second vehicles 1,2 form parts of a string comprising a plurality of vehicles platooning by means of the V2V communication. In this example, the second vehicle 2 follows immediately behind the first vehicle 1. In the string each vehicle transmits wireless signals representative of the dimensions, velocity and the acceleration of the transmitting vehicle. The vehicle immediately behind the respective transmitting vehicle receives said wireless signals from the transmitting vehicle. Thereby, in this vehicle platooning process, each vehicle, except a vehicle at the front of the string, is a receiving vehicle controlled to be at a relatively short distance from a transmitting vehicle immediately in front of the respective receiving vehicle.

The vehicle control system of the respective receiving vehicle controls brakes and a drivetrain of the receiving vehicle based on the wireless signals received from the respective transmitting vehicle.

It should be noted that in some embodiments, the vehicle control system of the respective receiving vehicle may control brakes and a drivetrain of the receiving vehicle based on the wireless signals received from a vehicle in front of the vehicle immediately in front of the respective receiving vehicle, e.g. from the vehicle at the front of the string, as an alternative to or in addition to wireless signals received from the vehicle immediately in front of the respective receiving vehicle.

In addition to the equipment for CACC, each vehicle 1, 2 comprises a movement sensor in the form of a radar sensor 111, 211 by means of which the distance to, velocity of and acceleration of a vehicle in front of the respective vehicle may be determined. The respective control unit 102, 202 is arranged to receive signals from the respective radar sensor 111, 211. The radar sensor 111, 211 provides means in addition to the CACC equipment for controlling the respective vehicle in relation to other vehicles. In alternative embodiments, the movement sensor could be a LIDAR sensor or a camera.

Figure 2:
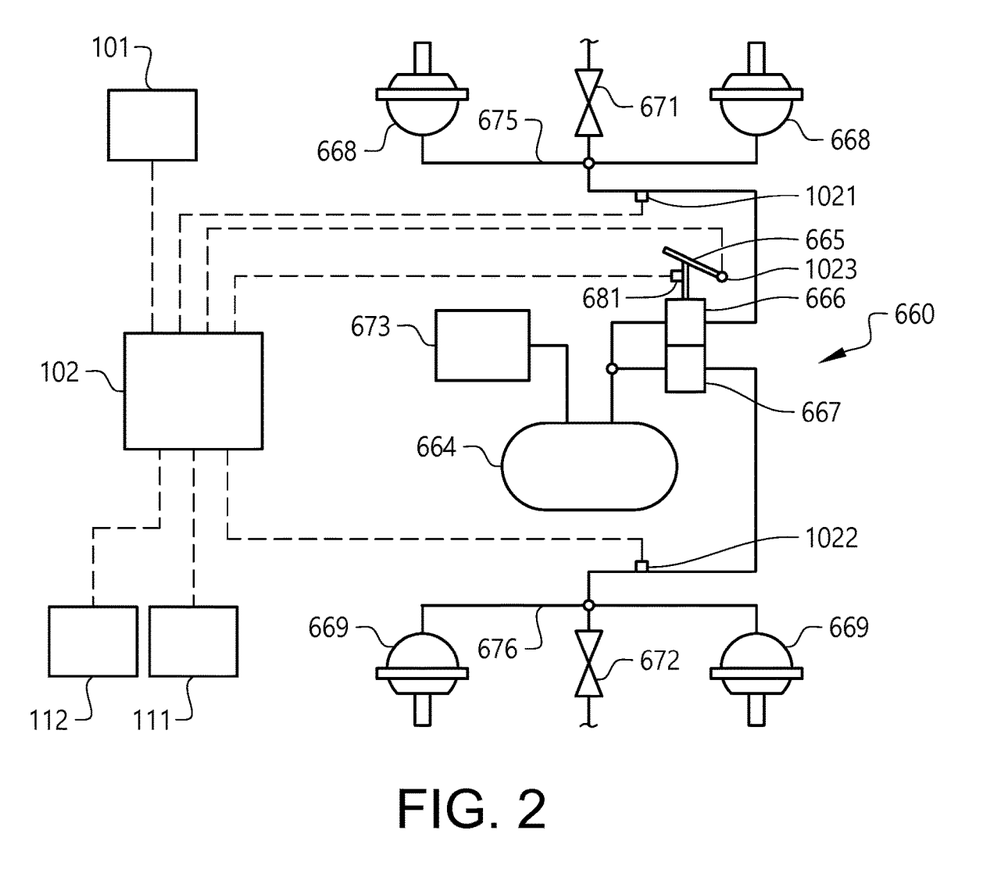
FIG. 2 shows parts of a first of the vehicles in FIG. 1.

Reference is made also to FIG. 2, depicting parts present in the first vehicle 1. The first vehicle 1 comprises a pneumatic brake system 660. The brake system 660 comprises an air compressor 673, which may be arranged to be driven by the crankshaft of an engine (not shown) of the vehicle, or by any other suitable means, such as an electric motor. The compressor 673 is connected to a compressed air storage tank 664, and is thereby arranged to deliver the compressed air to the air storage tank 664. A driver's brake pedal 665 is arranged to actuate brake control valves 666, 667 for front and rear wheel brake circuits 675, 676, and front and rear wheel brakes 668, 669, respectively. Release valves 671, 672 are arranged to release the pressure in the front and rear wheel brake circuits 675, 676, respectively.

The brake system also comprises a brake control device 681 arranged to actuate the brake control valves 666, 667 independently of the brake pedal 665. The brake control device is controllable by the control unit 102. Thereby, the brake control valves 666, 667 may be actuated in the absence of a driver command by means of the brake pedal 665.

The control unit 102 is arranged to receive signals from brake pressure sensors 1021, 1022 arranged to detect the pressure in a respective of the front and rear wheel brake circuits 675, 676. The control unit 102 is further arranged to receive signals from a brake pedal sensor 1023 arranged to detect the position of the brake pedal 665.

The control unit 102 is further arranged to receive signals from an acceleration sensor 112, in order to determine the acceleration of the first vehicle 1. FIG. 2 also shows the radar sensor 111 described above.

Figure 3:
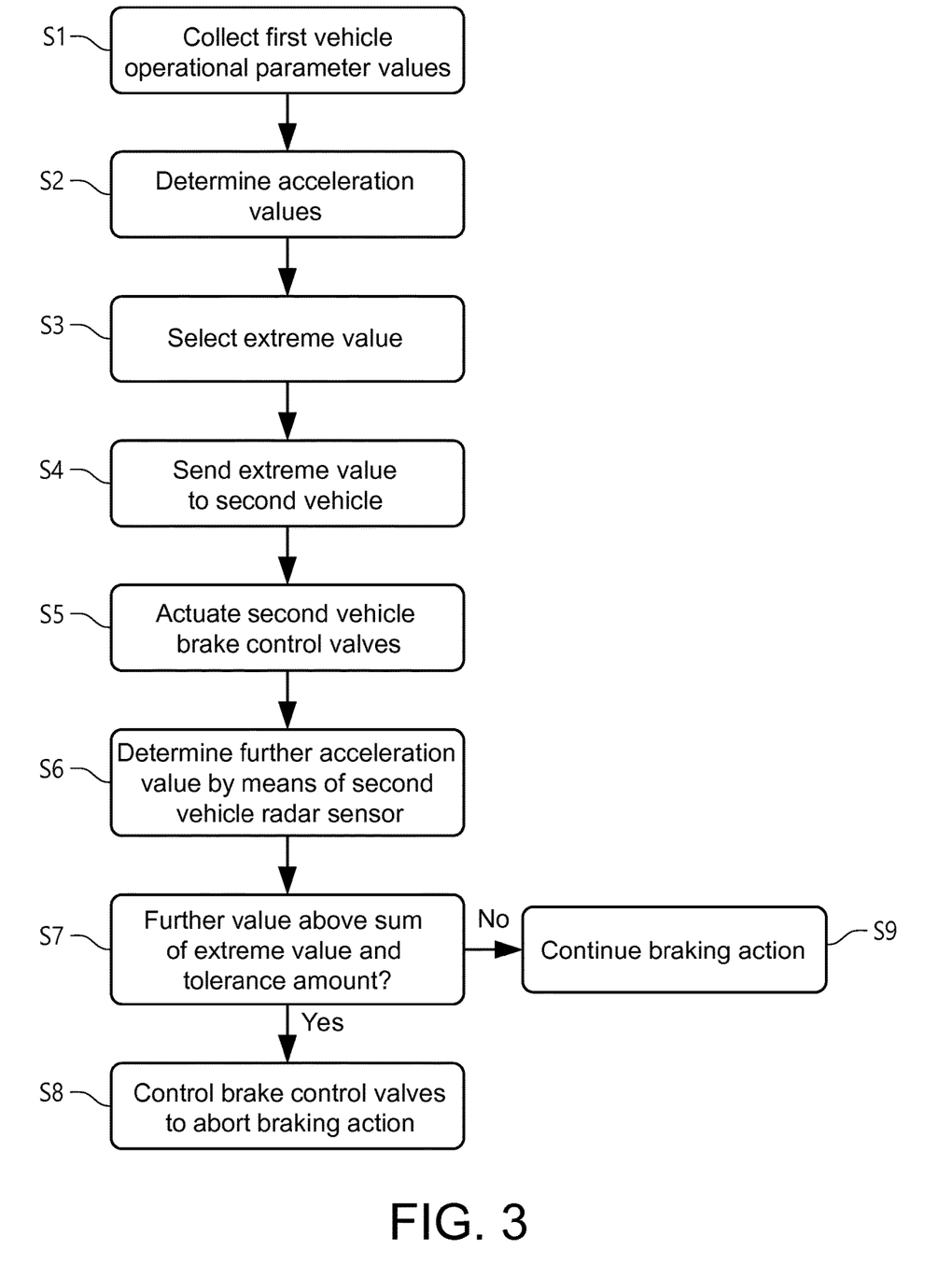
FIG. 3 is a diagram depicting steps in an embodiment of a method performed by the vehicles in FIG. 1.
Figure 4:
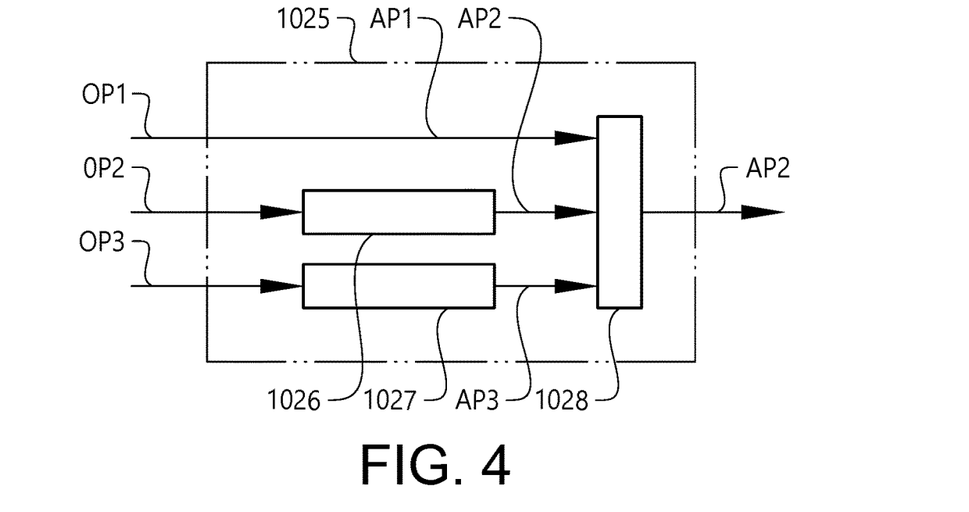
FIG. 4 depicts functions of a control unit of the first vehicle in FIG. 1.

With reference to FIG. 3 and FIG. 4, a method according to an embodiment of the invention will be described. The method comprises the first vehicle 1, more specifically the control unit 102 of the first vehicle 1, collecting S1 from a plurality of sources 112, 1021, 1022, 1023 values OP1-OP3 of operational parameters related to the operation of the first vehicle. The sources in this example are the acceleration sensor 112, 212, the brake pedal sensor 1023, and the brake pressure sensors 1021, 1022. The operational parameters are thus the measured acceleration OP1, the brake pedal position OP2, and the brake pressure OP3 in the front and rear wheel brake circuits 675, 676. Each of the operational parameters is in embodiments of the invention either the acceleration of the first vehicle, or related to the acceleration of the first vehicle, e.g. by being proportional or inversely proportional to the acceleration of the first vehicle.

The control unit 102 is programmed to provide as depicted in FIG. 4 an acceleration prediction function 1025. The acceleration prediction function 1025 is arranged to determine S2, based on the operational parameter values OP1-OP3 a plurality of values AP1-AP3 of an acceleration parameter indicative of an acceleration of the first vehicle. In this example, based on the operational parameter values OP1-OP3 acceleration values AP1-AP3 are determined.

A first acceleration value AP1 is determined as the measured acceleration OP1. A second acceleration value AP2 is determined based on the brake pedal position OP2 by means of a second acceleration value determination function 1026. The second acceleration value AP2 is indicative of a predicted acceleration of the first vehicle, since there is a latency from a driver request, in the form of the brake pedal 665 being pressed, to the resulting acceleration. A third acceleration value AP3 is determined based on the brake pressure OP3 by means of a third acceleration value determination function 1027.

An extreme value AP2, indicative of the lowest acceleration of the first vehicle 1, i.e. the highest deceleration acceleration of the first vehicle, is selected S3 from the acceleration values AP1-AP3. More specifically, an extreme value determination function 1028 is arranged to select the lowest of the acceleration values AP1-AP3, in this example the second acceleration value AP2.

It is understood that there could be alternative of additional sources for values of operational parameters, for example signals from the radar sensor 111, or a LIDAR sensor (not shown). Thus, sensors used for known systems such as AEBS (Advanced Emergency Braking System) or ACC (Autonomous Cruise Control), could also be used in embodiments of the invention. Suitably, any source providing operational parameter values which are in some way related to the acceleration of the vehicle may be used.

As depicted in FIG. 1, the extreme value AP2 is sent S4 by means of the V2V communication to the second vehicle 2. Herein, the extreme value AP2 is also referred to as a communicated value AP2.

Figure 5:
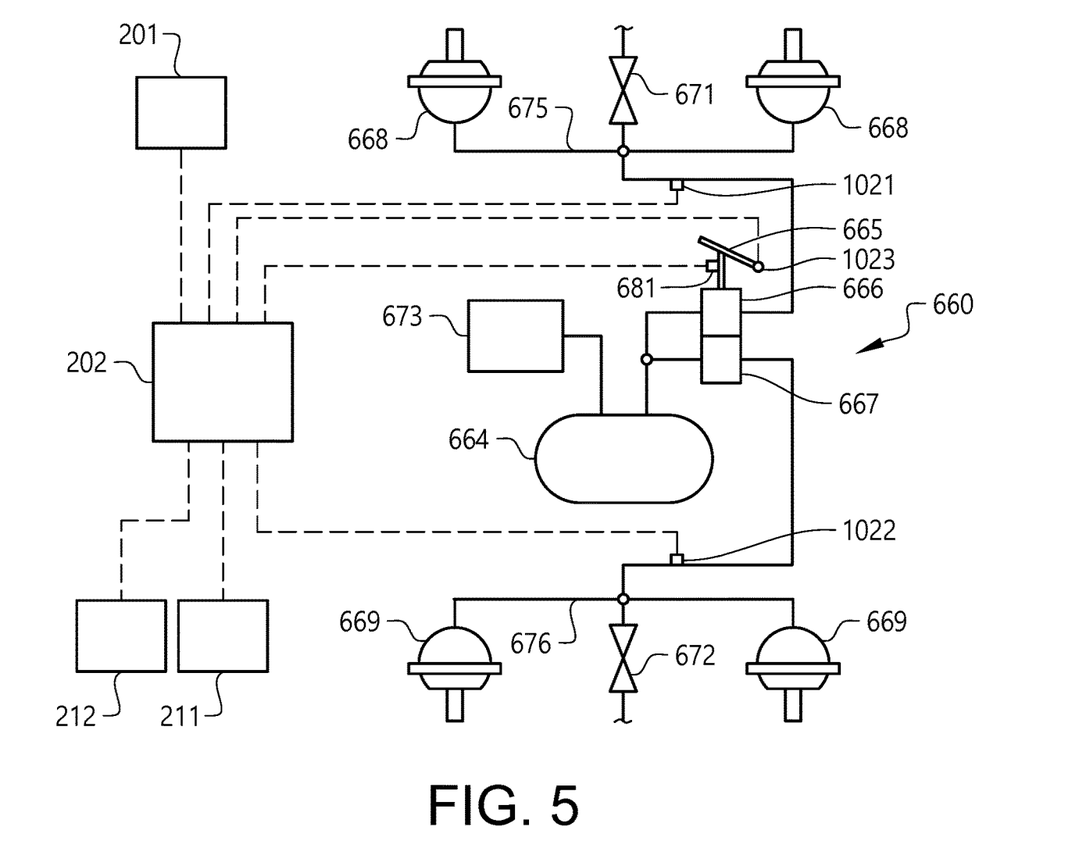
FIG. 5 shows parts of a second of the vehicles in FIG. 1.

Reference is made also to FIG. 5, depicting parts present in the second vehicle 2. The second vehicle is in this example, for keeping the presentation simple, equipped with the same parts as the parts of the first vehicle 1, depicted in FIG. 2, including acceleration sensor 212. It should be noted that the invention does not require such a similarity between parts in the vehicles. For example, the invention does not require similar brake systems in the vehicles in the string. Thus, some of the vehicles in the string may present brake systems, e.g. hydraulic brake systems, which are of a different type than the brake systems of other vehicles.

Upon receiving the extreme value AP2 by means of the CACC equipment 201, the second vehicle 2 initiates, in dependence on the extreme value AP2, a control of braking means 668, 669 for a braking action of the second vehicle 2. More specifically, upon the control unit 202 receiving the extreme value AP2 from the CACC equipment 201, the control unit 202 controls the brake control device 681 to actuate the brake control valves 666, 667. The level of actuation of the brake control device 681 is proportional to the extreme value AP2.

Subsequently to the second vehicle brake control valve actuation S5, the second vehicle control unit 202 determines, based on signals from the radar sensor 211, whether to adjust the control of the brake control valves 666, 667 to abort the braking action. More specifically, the control unit 202 determines S6 based on the signals from the radar sensor 211 a further value AP4 of the acceleration parameter indicative of the acceleration of the first vehicle 1. In this example, the further value AP4 is the acceleration of the first vehicle 1 as determined by means of the radar sensor 211, herein also referred to as a further acceleration value AP4.

Thereupon it is determined S7 whether the further acceleration value AP4 (which is negative) is above the extreme value AP2 (which is negative) by more than a tolerance amount dAP. The tolerance amount dAP is positive and determined based on the extreme value AP2. More specifically, the tolerance amount dAP is proportional to the absolute value of the extreme value AP2. In alternative embodiments, the tolerance amount dAP may be predetermined.

If the further acceleration value AP4 is above the extreme value AP2 by more than the tolerance amount dAP, the brake control valves 666, 667 are controlled S8 to abort the braking action. If the further acceleration value AP4 is below the sum of the extreme value AP2 and the tolerance amount dAP, the brake control valves 666, 667 are controlled S9 to continue the braking action.

In some embodiments, the tolerance amount dAP is dependent on a lapse of time from the collection S1 of the operational parameter value OP2 based on which the extreme value AP2 is determined, to the comparison of the further acceleration parameter value AP4 with the extreme value AP2. The CACC may include a time synchronization between the vehicles in the string. When the first vehicle sends the extreme value AP2, information about the time of collection S1 of the operational parameter value OP2, based on which the extreme value AP2 was determined, may be sent along with the extreme value AP2. Said lapse of time may then be determined by the second vehicle 2.

In some embodiments, the dependence of the tolerance amount dAP on the lapse of time from the collection S1 of the operational parameter value OP2 to the comparison of the further acceleration parameter value AP4 with the extreme value AP2, may be effected by the data sent to the second vehicle including information about the time of the determination S2 of the extreme value AP2 based on the operational parameter value OP2. In such embodiments, also the lapse of time between the collection S1 of the operational parameter value OP2 and the determination S2 of the extreme value AP2 may be taken into account for determining the tolerance amount dAP.

Since there is normally a delay in time from the collection of the operational parameter value OP2, to a resulting acceleration of the first vehicle which is registered by the radar sensor 111, the tolerance amount dAP may be relatively large for a relatively short lapse of time from the collection S1 of the operational parameter value OP2 to the comparison of the further acceleration parameter value AP4 with the extreme value AP2. For a relatively long lapse of time from the collection S1 of the operational parameter value OP2 to the comparison of the further acceleration parameter value AP4 with the extreme value AP2, the tolerance amount dAP may be relatively small.

In alternative embodiments, the acceleration parameter values AP1-AP3 are sent from the first vehicle 1 by means of the V2V communication to the second vehicle 2, wherein determining the extreme value AP2 is done by the second vehicle 2.

In further alternative embodiments, the operational parameter values OP1-OP3 are sent from the first vehicle 1 by means of the V2V communication to the second vehicle 2, wherein determining the acceleration parameter values AP1-AP3 and the extreme value AP2 is done by the second vehicle 2.

It should be noted that the invention is applicable also where a third vehicles is travelling between the first and second vehicles 1, 2. In such embodiments, the second vehicle may, upon receiving the extreme value AP2 from the first vehicle 1 by means of the CACC equipment 201, and actuating the brake control valves 666, 667, determine based on the signals from the radar sensor 211 the acceleration of the third vehicle 3. Thereby, the second vehicle may determine whether to abort the braking action based on a comparison of the acceleration of the third vehicle 3, and the extreme value AP2 which is indicative of an acceleration or a predicted acceleration of the first vehicle 1.

Figure 6:
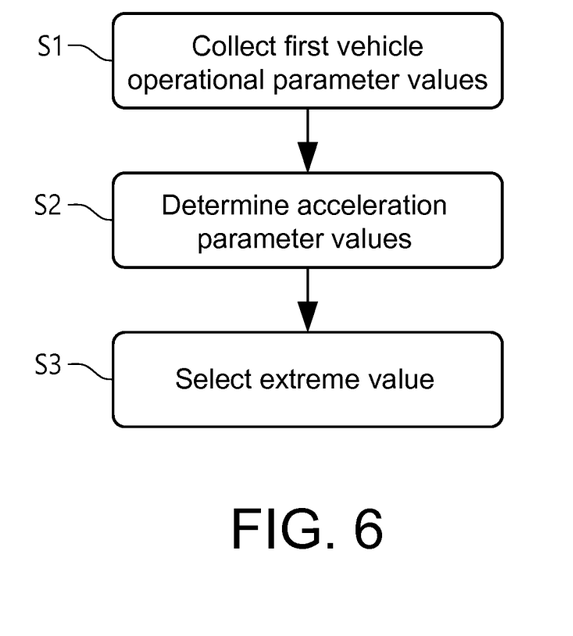
FIG. 6 is a diagram depicting steps in a further embodiment of a method performed by a vehicle in a string of platooning vehicles.

Further variations are possible within the scope of the claims. FIG. 6 depicts steps in a simple embodiment of the invention. The method comprises collecting S1 from a plurality of sources values of operational parameters related to the operation of a first vehicle of a plurality of vehicles platooning by means of vehicle-to-vehicle (V2V) communication. Based on the operational parameter values a plurality of values of an acceleration parameter indicative of an acceleration of the first vehicle are determined S2. From the acceleration parameter values an extreme value indicative of the lowest acceleration of the first vehicle is selected S3.

It is to be understood that the present invention is not limited to the embodiments described above and illustrated in the drawings; rather, the skilled person will recognize that many changes and modifications may be made within the scope of the appended claims.

The invention claimed is:

1. A method for a string comprising a plurality of vehicles platooning by means of vehicle-to-vehicle (V2V) communication, comprising: collecting from a plurality of sources values of operational parameters related to the operation of a first of the vehicles, determining based on the operational parameter values a plurality of values of an acceleration parameter indicative of an acceleration of the first vehicle, selecting from the acceleration parameter values an extreme value indicative of the lowest acceleration of the first vehicle, and a second of the vehicles following behind the first vehicle determining, or receiving by means of the V2V communication, the extreme value, and initiating in dependence on the extreme value a control of brakes for a braking action of the second vehicle, wherein determining the acceleration parameter values is done by the first vehicle, where the second vehicle is provided with a movement sensor for determining the distance to, velocity of and/or acceleration of a vehicle in front of the second vehicle, wherein the second vehicle, subsequently to the initiation of the control of the brakes, determining at least partly based on signals from the movement sensor whether to adjust the control of the brakes, and wherein, as soon as the first vehicle brakes hard, or is predicted to brake hard, sending the extreme value to the second vehicle, and the second vehicle immediately initiating activation of its brakes based on the received extreme value, wherein during a time lag from the braking control initiation to the resulting acceleration of the second vehicle, the second vehicle compares the acceleration of the first vehicle indicated by the extreme value, determined, or received over the V2V communication, by the second vehicle, to information based on the signals from the movement sensor, and when the information based on the signals from the movement sensor substantially agree with the extreme value, the braking is continued, and when the information based on the signals from the movement sensor disagrees with the extreme value, the braking is discontinued.

2. The method according to claim 1, characterized in that at least one of the acceleration parameter values is indicative of a predicted acceleration of the first vehicle.

3. The method according to claim 1, characterized in that selecting the extreme value is done by the first vehicle.

4. The method according to claim 3, characterized by sending the extreme value by the V2V communication to the second of the vehicles following behind the first vehicle.

5. The method according to claim 1, characterized by sending by the V2V communication the acceleration parameter values to the second of the vehicles following behind the first vehicle.

6. The method according to claim 1, characterized in that selecting the extreme value is done by the second vehicle.

7. The method according to claim 1, characterized in that initiating the control of the brakes comprises controlling the brakes for providing a braking force of the second vehicle which is proportional to the extreme value, or controlling the brakes for providing a braking force of the second vehicle which is at a maximum level.

8. The method according to claim 1, characterized in that adjusting the control of the brakes comprises controlling the brakes to abort the braking action.

9. The method according claim 1, characterized in that determining whether to adjust the control of the brakes comprises determining based on the signals from the movement sensor a further value of the acceleration parameter indicative of the acceleration of a vehicle in front of the second vehicle, and comparing the further acceleration parameter value with the extreme value.

10. The method according to claim 9, characterized by adjusting the control of the brakes when the further acceleration parameter value is above the extreme value by more than a tolerance amount.

11. The method according to claim 10, characterized by determining the tolerance amount at least partly based on the extreme value.

12. The method according to claim 10, characterized in that the tolerance amount is predetermined.

13. The method according to claim 9, characterized in that the determination whether to adjust the control of the brakes is partly based on a lapse of time from the collection of the operational parameter value based on which the extreme value is determined, to the comparison of the further acceleration parameter value with the extreme value.

14. The method according to claim 1, where the second vehicle follows immediately behind the first vehicle.

15. The method according to claim 1, where a third vehicle is travelling between the first and second vehicles.

16. A non-transitory computer readable medium carrying a computer program comprising program code for performing the steps of claim 1 when said program code is run on a computer.

17. A method for a string comprising a plurality of vehicles platooning by means of vehicle-to-vehicle (V2V) communication, where a primary of the vehicles is provided with a movement sensor for determining the distance to, velocity of and/or acceleration of a vehicle in front of the primary vehicle, the primary vehicle determining, or receiving by means of the V2V communication, a communicated value of an acceleration parameter indicative of an acceleration of a secondary of the vehicles, in front of the primary vehicle, and initiating in dependence on the communicated value a control of brakes for a braking action of the primary vehicle, wherein the primary vehicle, subsequently to the initiation of the control of the brakes, determining at least partly based on signals from the movement sensor whether to adjust the control of the brakes, wherein initiating the control of the brakes comprises controlling the brakes for providing a braking force of the primary vehicle which is proportional to the communicated value, or controlling the brakes for providing a braking force of the primary vehicle which is at a maximum level, wherein the primary vehicle, subsequently to the initiation of the control of the brakes, determining at least partly based on signals from the movement sensor whether to adjust the control of the brakes, and wherein, as soon as the secondary vehicle brakes hard, or is predicted to brake hard, sending the extreme value to the primary vehicle, and the primary vehicle immediately initiating activation of its brakes based on the received extreme value, wherein during a time lag from the braking control initiation to the resulting acceleration of the primary vehicle, the primary vehicle compares the acceleration of the secondary vehicle indicated by the extreme value, determined, or received over the V2V communication, by the primary vehicle, to information based on the signals from the movement sensor, and when the information based on the signals from the movement sensor substantially agree with the extreme value, the braking is continued, and when the information based on the signals from the movement sensor disagrees with the extreme value, the braking is discontinued.

18. The method according to claim 17, characterized in that adjusting the control of the brakes comprises controlling the braking means to abort the braking action.

19. The method according to claim 17, characterized in that determining whether to adjust the control of the brakes comprises determining based on the signals from the movement sensor a further value of the acceleration parameter indicative of the acceleration of a vehicle in front of the primary vehicle, and comparing the further acceleration parameter value with the communicated value.

20. The method according to claim 19, characterized by adjusting the control of the brakes when the further acceleration parameter value is above the communicated value by more than a tolerance amount.

21. The method according to claim 20, characterized by determining the tolerance amount at least partly based on the communicated value.

22. The method according to claim 20, characterized in that the tolerance amount is predetermined.

23. The method according to any one of claim 19, characterized in that the determination whether to adjust the control of the brakes is partly based on a lapse of time from a collection of an operational parameter value based on which the communicated value is determined, to the comparison of the further acceleration parameter value with the communicated value.

24. The method according to claim 17, where the primary vehicle follows immediately behind the secondary vehicle.

25. The method according to claim 17, where a third vehicle is travelling between the primary and secondary vehicles.

* * * * *